US009048780B2

(12) United States Patent
Caster et al.

(10) Patent No.: US 9,048,780 B2
(45) Date of Patent: Jun. 2, 2015

(54) OPEN ENERGY SYSTEM

(71) Applicants: Cassandra Arina Caster, Albuquerque, NM (US); Justin Robert Hawkins, Albuquerque, NM (US)

(72) Inventors: Cassandra Arina Caster, Albuquerque, NM (US); Justin Robert Hawkins, Albuquerque, NM (US)

( * ) Notice: Subject to any disclaimer, the term of this patent is extended or adjusted under 35 U.S.C. 154(b) by 249 days.

(21) Appl. No.: 13/896,755

(22) Filed: May 17, 2013

(65) Prior Publication Data

US 2014/0338720 A1 Nov. 20, 2014

(51) Int. Cl.
H02S 10/40 (2014.01)
H02S 20/30 (2014.01)
H02S 30/20 (2014.01)
H01L 31/04 (2014.01)

(52) U.S. Cl.
CPC ............... *H02S 10/00* (2013.01); *H02S 10/40* (2014.12); *H02S 30/20* (2014.12); *H02S 20/30* (2014.12); *Y02E 10/50* (2013.01)

(58) Field of Classification Search
CPC .............. F24J 2/36; H02S 30/20; H02S 20/30
See application file for complete search history.

(56) References Cited

U.S. PATENT DOCUMENTS

| | | | |
|---|---|---|---|
| 4,452,234 A * | 6/1984 | Withjack | 126/627 |
| 7,230,819 B2 | 6/2007 | Muchow et al. | |
| 7,469,541 B1 | 12/2008 | Melton et al. | |
| 7,793,467 B1 * | 9/2010 | Melton et al. | 52/79.1 |
| 8,299,645 B2 | 10/2012 | Muchow et al. | |
| 2005/0231157 A1 * | 10/2005 | Sanders et al. | 320/109 |
| 2010/0206354 A1 * | 8/2010 | Greene et al. | 136/245 |
| 2011/0047891 A1 * | 3/2011 | Andretich | 52/79.5 |
| 2011/0056146 A1 * | 3/2011 | Appert | 52/79.1 |
| 2011/0146751 A1 * | 6/2011 | McGuire et al. | 136/245 |
| 2011/0176256 A1 * | 7/2011 | Van Straten | 361/601 |
| 2011/0253614 A1 * | 10/2011 | Curran et al. | 210/239 |
| 2012/0025750 A1 * | 2/2012 | Margo | 320/101 |
| 2012/0080072 A1 | 4/2012 | Bullivant et al. | |
| 2012/0291847 A1 * | 11/2012 | Rowe et al. | 136/245 |
| 2012/0293111 A1 * | 11/2012 | Sentinelli et al. | 320/101 |
| 2012/0313569 A1 * | 12/2012 | Curran | 320/101 |
| 2013/0037080 A1 * | 2/2013 | Helfan et al. | 136/245 |

FOREIGN PATENT DOCUMENTS

IT WO2013061354 a2 * 5/2013 ............ H01L 31/045

* cited by examiner

*Primary Examiner* — Jeffrey T Barton
*Assistant Examiner* — Eric R Smith

(57) ABSTRACT

Disclosed is a portable and compact hybrid power unit for ready to use, plug-in power for nearly any environment. Open Energy System (OES) is self-contained in a durable shell that can be deployed almost anywhere in the world. The OES transforms from a rugged box into an energy generating unit with all equipment assembled and ready to generate power. Pre-assembled solar modules can slide out from the opening sides of the unit along a rolling channel, lock into place and open into a ready-to-generate solar electric array. In addition, the OES is mobile and transportable. It can hitch to a vehicle, be dropped in by helicopter, shipped in or used as a permanent unit. Further, the OES unit is designed to fit 5 to a standard shipping container and can be deployed using various shipping methods.

20 Claims, 8 Drawing Sheets

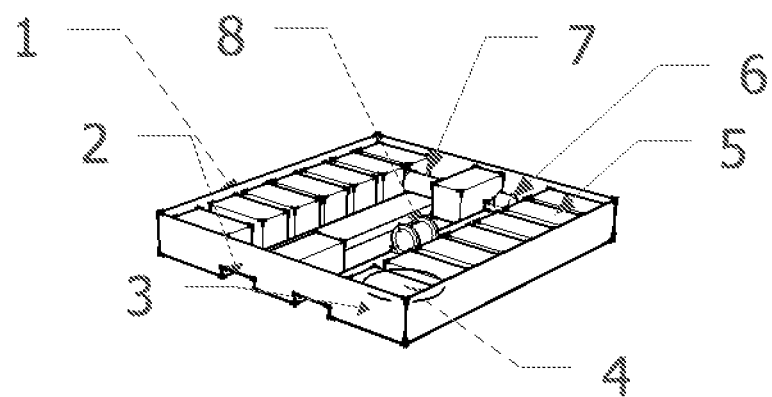
FIG. 1 Base - Battery Bank

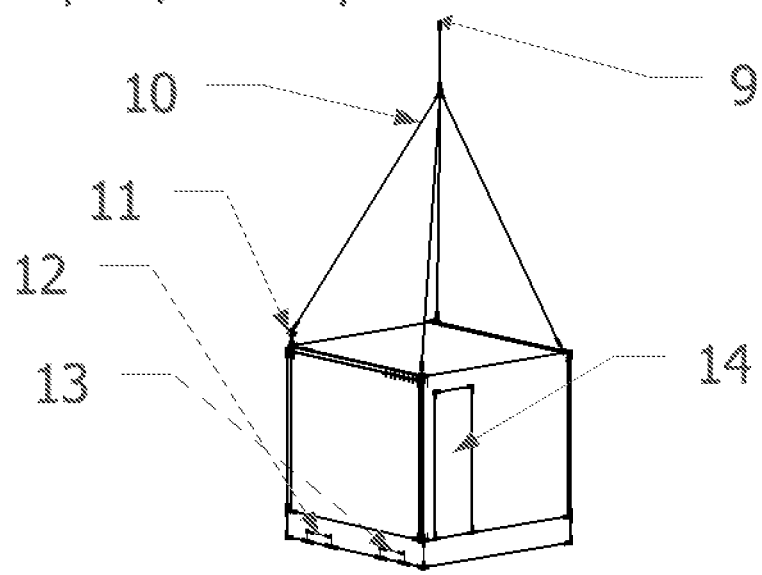

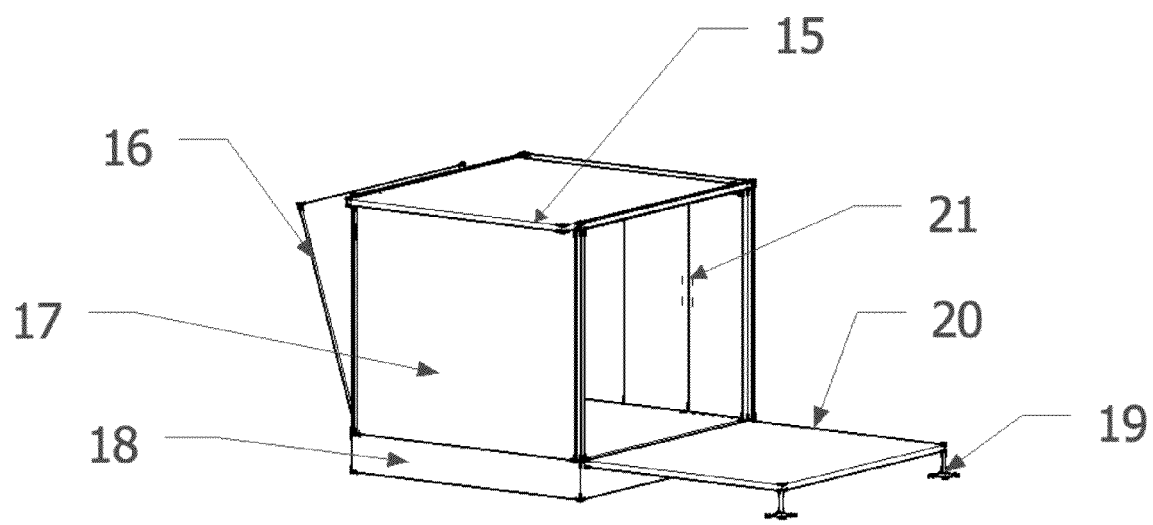
FIG 3: First Phase of Deployment

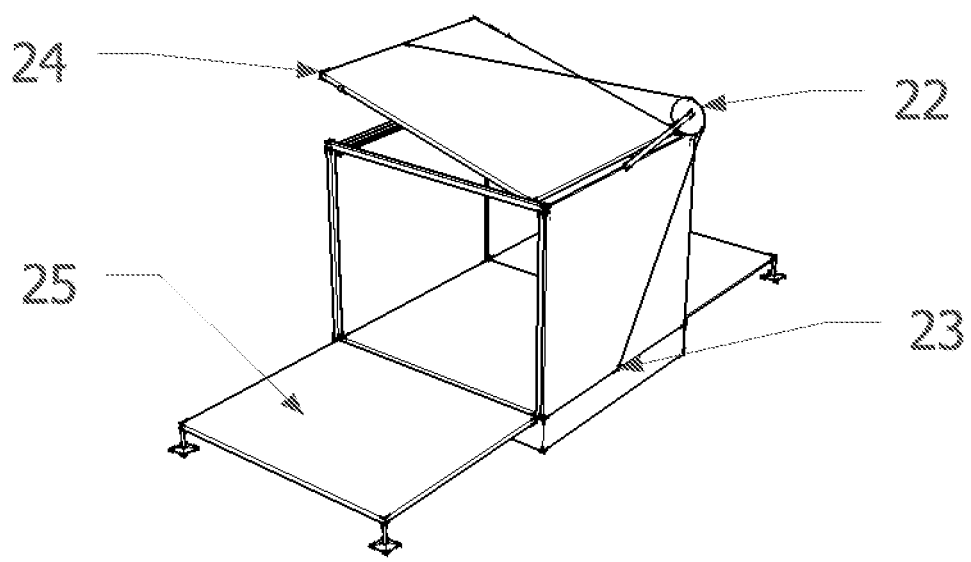

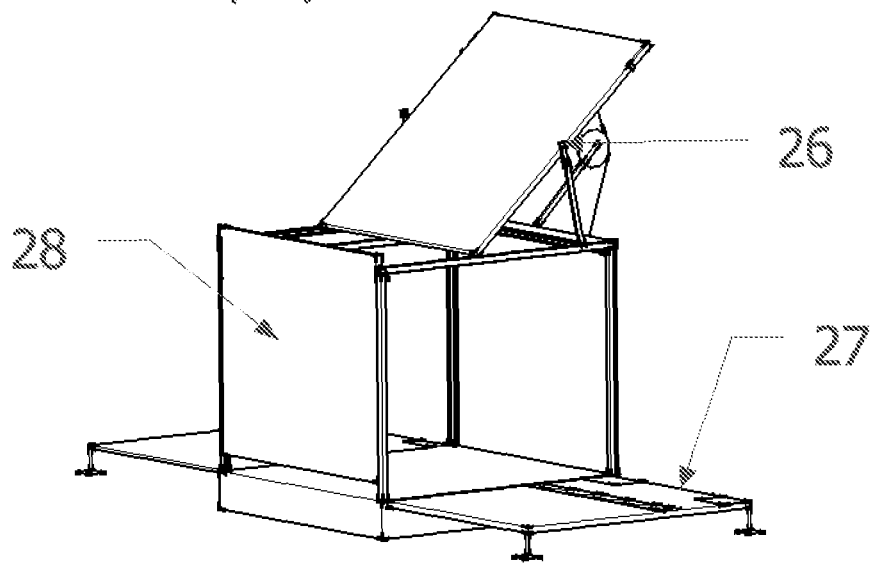

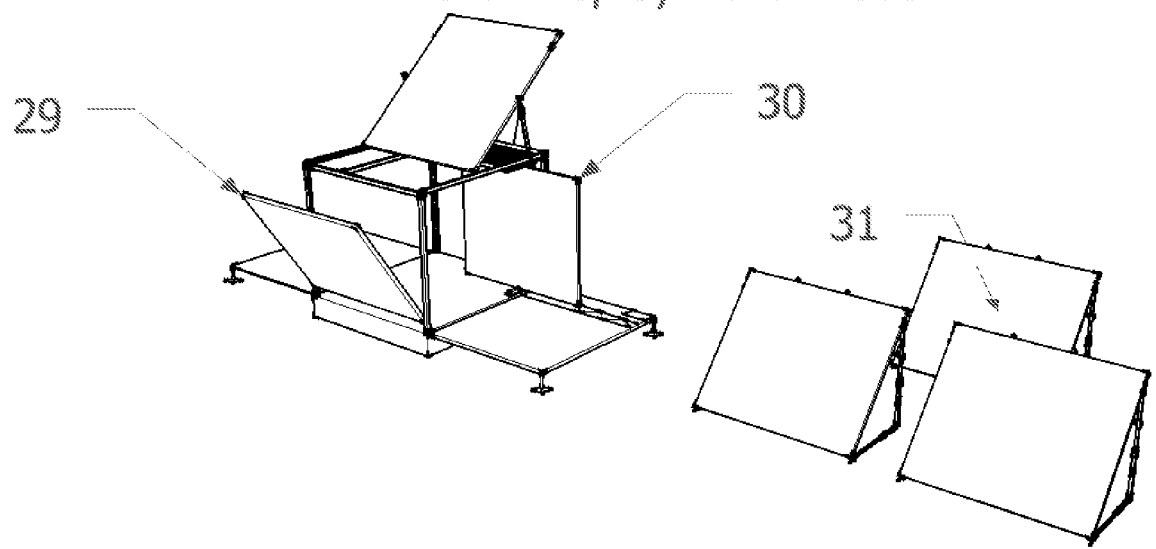

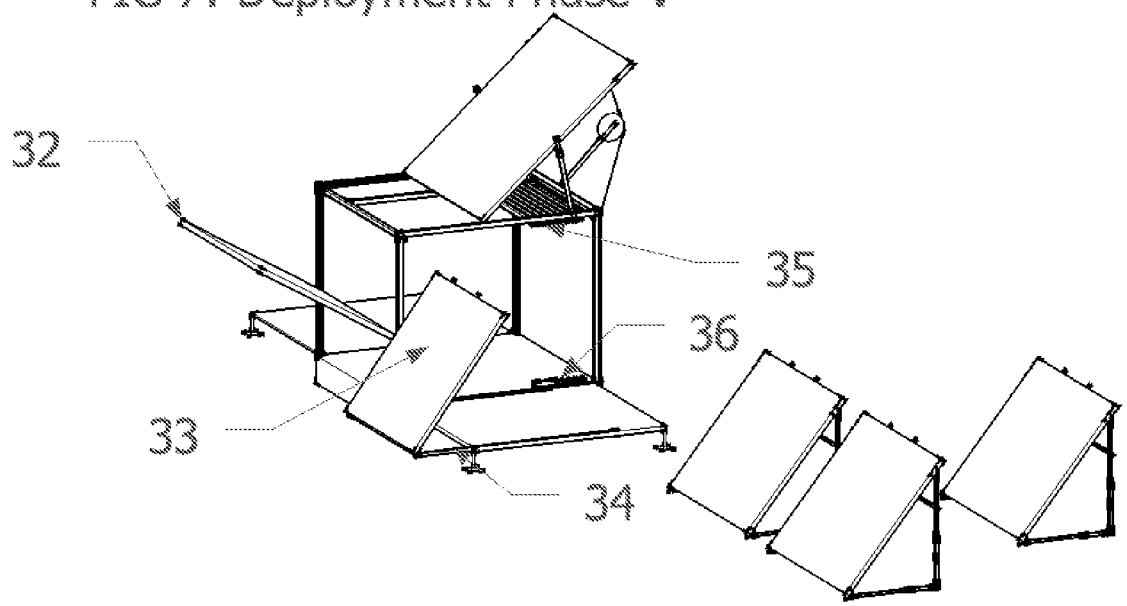

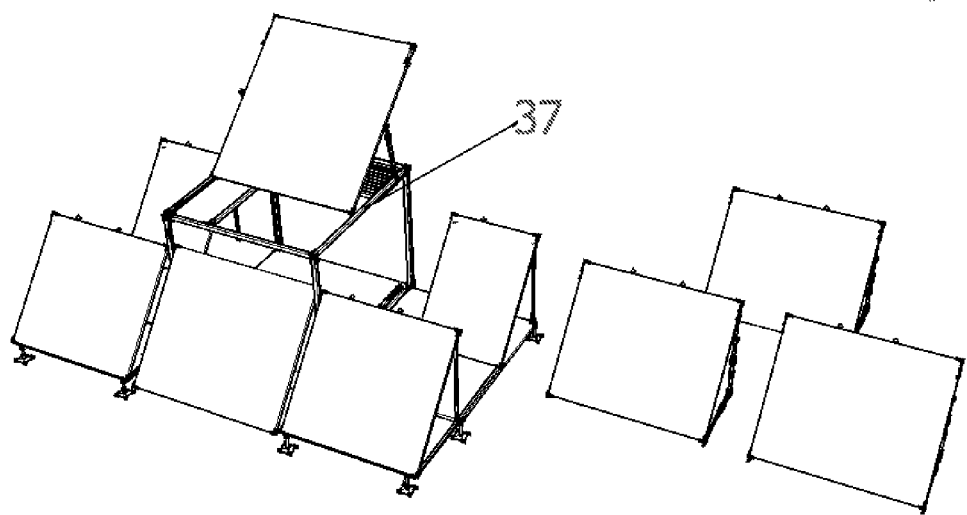
FIG 8: FULLY DEPLOYED OPEN ENERGY SYSTEM (OES)

OPEN ENERGY SYSTEM

BACKGROUND OF THE INVENTION

1. Technical Field of the Invention

The present invention relates generally to power systems and more particularly to mobile, self-contained, easily deployed, renewable electric power systems. It is a completely contained unit, ready to use and capable of being stationary or moved by several methods of transportation including: by land, by sea and by air. It is fully equipped with all needed components and requires little to no assembly.

2. Description of the Prior Art

Electrical power generated from renewable sources such as solar, wind and bio fuels reduces the need for obtaining from dangerous, expensive and potentially harmful fuel sources. Getting electricity where and when it is needed is an issue faced around the world. While many locations may have readily available access to traditional electrical power grids, there remain vast regions where electric power is not obtainable. Even in locations where electric power is available, a need for a clean, safe power source is desirable. From the military fighting around the world in rural and hostile areas to reaching disaster affected areas that are in need of crucial power, electricity becomes a precious and sought after commodity.

Further, while there are portable, self-contained electric power units available on the market today, many are heavy in weight, not easily maneuverable, have small output and are difficult to assemble. Knowledge of electrical assembly, heavy lifting and tedious logistics become necessary to operate such existing devices. In turn, disassembly also becomes a contending issue.

Units that are not self-contained are more or less permanently attached to a structure making removal near impossible if not improbable. Many units are not pre-wired or pre-assembled and are otherwise not ready to use upon delivery. Assembly of conventional power generating systems requires several people to make the unit ready to use.

Other units simply use ISO shipping containers as the housing and containment of the equipment. The solar modules must then be later attached to the structure and therefore the unit is not preassembled. ISO shipping containers are also very large and have many transportation limitations.

Additionally, mobility is an issue for remote power systems. Generally many units are not designed for efficient transportation once the destination has been reached. Units must be disassembled and moved with a fork lift or other heavy equipment each time or in some cases the unit cannot be moved once it is placed, due to its weight.

U.S. Pat. No. 7,230,819 describes a mobile power system that is the size of an ISO freight container. It also doubles as a human shelter. The components of the solar array are housed inside the container during shipping and are to be installed once the unit is at its location. Said method comprising consists of a number of holes or passages for assistance in connecting the exterior components to the housing and solar arrays must be bolted in place with mounted side brackets.

This method is limited by its weight and size. Whereas transportability may be achieved, mobility is restricted. The ability for an individual(s) to assemble and disassemble may also be an obstacle.

U.S. Pat. No. 7,469,541 describes a portable power assembly that sits atop a skid. The solar array is mounted on a metal mast, the batteries, charge controller and inverter are enclosed inside a side box and the generator is located on the opposite side to balance the weight of the unit.

This unit is limited in its ability to be transportable as it is not self-contained. Delivery of the unit has also previously been cumbersome and requires heavy equipment. Shipment of the power units are confined to lifting units up with a forklift and then being loaded onto truck beds to travel over long roads. Long distances for overseas haul are further limited as the unit cannot be easily placed inside shipping containers as the array mast is protruding. Disassembly would be the only solution for this design which would further negate the simplicity and ready to use nature of the unit.

US Patent Application Number 20120080072 is a military field deployable electrical generating system using renewable energy sources. The system is housed in two standard military shipping containers. Each of the solar modules has discs attached so that the solar panel can be assembled in the field by sliding each disc into a mounting channel. This disc and channel structure also allows each solar panel to be stored in the shipping container by using similar channels mounted back to back in a storage frame located in one of the containers. The internal storage appears to provide convenience and protection.

This design is limited in the number of modules it can hold and thus the amount of wattage the system produces. This method requires more units in order to generate more power. Additionally, the solar panels must be manually secured in place with a lock in pin, adding to assembly and creating more objects and pieces that can become lost through transportation and assembly/disassembly.

U.S. Pat. No. 8,299,645 is very mobile as it is a power system stored in the body of the trailer. The frame includes a front panel, side panels, and a rear panel, and the trailer further includes a hitch configured to connect the trailer to a vehicle. The unit however is not easily transportable overseas or for any other form of transportation other than being pulled behind a vehicle that is able to pull it. The unit is also not self-contained and is restricted by weight and due to the nature of the design, is always open and subject to environmental factors unless it is completely disassembled.

Existing power generating units also lack versatility in utilizing other types of sources to generate power. Many units use a single type of power such as diesel, gas, PV or wind, but not a combination of many sources. Utilization of many types of power can be difficult and even dangerous.

The present invention provides a power generating system that avoids all of the aforesaid shortcomings in the prior art.

SUMMARY OF THE INVENTION

The present invention is a solar electrical power generating unit that is deployable, mobile, self-contained and pre-assembled. The unit is housed within a rugged container that opens from each side with the exception of the base of the unit and the support panel. Once fully opened, the unit transforms from a shippable container to a fully functional solar array that produces electricity. The present invention utilizes the container shell to protect the stored modules inside as well as to support the modules once deployed. The modules are pre-wired and located along rolling rack channels inside the inner lining of the container's shell so when each side of the container is opened, modules are revealed and ready to deploy.

The present invention includes a seamless roll-and-lock channel racking system within the frame and shell of the unit which allows the modules inside the unit to roll out onto a permanent track and lock into place using an interlocking mechanism. Both sides of the container as well as the top and front container panels open and each container panel acts as the structural support for the solar modules that will rest on them.

It is therefore the primary object of the present invention to provide a self-contained solar electrical power generating unit which will significantly improve the deployment and containment of mobile power units.

It is another object of the present invention to provide a solar electric power generating unit which will significantly enhance the convenience of mobility of solar electric power units by allowing for multiple ways to transport the unit.

It is a further object of the present invention to provide a pre-assembled solar electric power generating unit which can be operated by one person using limited to no equipment and otherwise operate the unit with ease, even to an individual with little to no experience in solar generating units.

It is still another object to provide alternative and clean sources of power with the solar electric power generating unit which would reduce human exposure to harmful and dangerous fuels and to reduce the hazards of obtaining fuel and electricity from unknown entities. Further, the present invention allows for such clean, alternative electric power in locations where there is no grid connectivity.

These and other objects of the present invention will become apparent to those skilled in this art upon reading the accompanying descriptions, drawings and headings included in this patent as well as claims set forth herein.

BRIEF DESCRIPTION OF THE DRAWINGS

FIG. 1 is the base perspective view of the solar power unit Open Energy System (OES) where the batteries and components are housed according to the present invention.

FIG. 2 is a perspective view of the OES closed and in transport/mobility mode of the present invention.

FIG. 3 is another perspective view of the OES first phase of deployment mode with the West, East and South container panels unlatching and rotating into platform position of the present invention.

FIG. 4 illustrates a rear and side perspective view of phase II of the deployment of the OES unit according to the present invention.

FIG. 5 illustrates phase III of the deployment demonstrating footing and braces of the OES unit of the present invention.

FIG. 6 is a side perspective view of phase IV of the deployment with the rolling rack and rack modules of the present invention.

FIG. 7 is a side perspective view of phase V of the deployment illustrating the rolling rack channels, rack modules and the lower rack guide for storage of the modules of the present invention.

FIG. 8 is a top view of the fully deployed OES solar power unit of the present invention.

DETAILED DESCRIPTION OF THE DRAWINGS

I. Definitions

PV as used herein shall mean the abbreviated version of the word Photovoltaic.

Rolling Rack Channels as used herein shall mean the permanent track manufactured on the container panels and frame by which the modules inside the unit roll onto for deployment.

Rack Modules as used herein shall mean the solar PV modules whose frame has been modified with rollers as to work in conjunction with the rolling rack channels for deployment purposes.

1. BEST MODE OF THE INVENTION

FIG. 2 and FIG. 8 show sectional views of the best mode contemplated by the inventor of the portable and preassembled renewable electrical power generating unit according to the concepts of the present invention. FIG. 1-FIG. 8 are presented and described below. However, FIG. 2 and FIG. 8 demonstrate the present invention fully deployed and completely closed to best understand the entirety of the concept.

2. HOW TO MAKE THE INVENTION

As can be amply seen from the drawings the Open Energy System (OES), is a portable and preassembled hybrid renewable electrical power generating unit that is self-contained, mobile and relevant to the portable energy field. As shown in FIG. 1 the OES sits atop a skid base 1 that is hollowed to house the electrical components of the present invention. The base of the unit houses the batteries 5, inverter, controller, winch 8 and other possible needed materials such as an air compressor and a compressed air receiver tank 6, 7 which are optional components. The base also provides a center of gravity for the unit and can be accessed by opening a floor door. Air vents, climate control features and base design contribute to the regulation of the batteries and other internal components. The inner contents of the base are fitted and secured as to prevent any movement. The base contains slide out pocket compartments 3, 4 for the winch wire, small jack, platform feet, pulley and unit wheel axle and small unit tires. The winch will be used to deploy the Top Container Panel; the small jack to lift the unit so the wheel axle and tires can be assembled for mobility of the unit; and the platform feet will attach to the East and West Container Panels. The platform base has forklift pockets 2 in order to be lifted and moved by forklift. The platform base forklift pockets double as sockets for wheel brackets when wheels and axel are assembled to the unit. The platform base serves as the foundation of the unit. The OES is constructed to fit five units to a single standard ISO shipping container.

FIG. 2 demonstrates the transportation/mobility modes when the unit is closed. The unit container has demountable lifting eyes on each corner that thread into roof corner for hoisting and aerial lifts/drops 11. Using the lifting eyes, rigging for hoist/crane/or parachute can be established 10 as the connection to crane, parachute, rigging or other hoisting mechanisms 9 heads to a form a single lifting point. As previously stated, the unit can be pulled by vehicle as the wheeled axel attachment 12, 13 mounts in the fork pockets for road travel. The trailer travel orientation is along East/West panel axis. While the unit is in closed transportation/mobility mode, the Access Door in North Container Panel (NCP) 14 can be used for internal access to contents during shipping or storage. The Access Door is located on the North Panel which is the panel that does not open and remains stationary. The North Container Panel 21 also serves as a structural support point for the unit when it is fully deployed.

FIG. 3 illustrates the first phase of deployment of the present invention. Built atop the base 18 is the frame of the unit 37. The frame of the unit always remains intact as the container panels open and close as well as to maintain the integrity of the unit. The frame also houses the upper and lower rack channels for the rolling rack modules to be stored and allow the modules to roll open when deployed and to roll back into the frame when ready to close. The structure of the frame also consists of rolling channels that allow the container panels to open and close.

The Top Container Panel (TCP) 15 unlatches and as it opens, the rear rollers move south/opposite the NCP along the roller channels on the frame in preparation for lifting. The (WCP) West Container Panel 16 unlatches and begins hinged rotation to horizontal platform position. The East Container Panel (ECP) 20 unlatches and fully folds down to platform position. Once the container panels are in horizontal position, platform feet 19 from the side storage compartments on the base of the unit are screwed into place on each of the corners of the container panels. The platform feet allow the unfolding container panels to have an even plane for the rack modules to roll onto. The platform feet are adjustable in their height footings as to adapt to site terrain. The South Container Panel 17 remains in transport closed position as the WCP and ECP open.

FIG. 4 demonstrates the phase two of deployment of the present invention. Using the hoisting pulley 3, 4 from the side storage compartments on the base of the unit, the TCP is ready to open. The hoisting pulley is inserted into a pocket on the top of the North Container Panel 21 that feeds wire from winch 8 inside Base/Battery Bank to the pulley 22. The pulley wire rope 4, 23 connects onto a clasp at the tip of the TCP 24, through the pulley and down to the winch. Operated with remote controller, the pulley and winch pull the TCP. As the TCP opens into a completely vertical location, the bottom of the TCP rolls along rolling channels located on the frame of the unit until it is stopped by a locking mechanism. The locking mechanism snaps the bottom of the TCP into place, which is at an optimal solar insolation angle. Underneath the TCP, wired solar modules are exposed. FIG. 4 also illustrates the ECP and WCP in fully deployed platform position 25.

FIG. 5 is Phase III of the deployment of the present invention. With the Top Container Panel (TCP) open and locked into place, one support brace/bracket 26 on each side of the Top Container Panel Frame lifts up to meet the TCP, locks onto the TCP through a snap and locking mechanism and provides support for the Top Container Panel at the optimal angle. The wire, brace and anchor connections are not shown in detail.

The East and West Container Panels serve as platforms where the rolling rack module panels inside the container frame will roll onto. The ECP and the WCP also both have a PV rack module(s) 33 on the lining of the panel that slides on an extendable brace 34. This can be seen in FIG. 7 and described in more detail in [0044]. Once the ECP rack modules and WCP rack modules are deployed, the rolling racks 27 on the panels are exposed. The East and West Container Panels have rolling rack channels 27 that align to the centrally enclosed rolling rack module panels inside the frame. Once the rolling rack modules are unhinged from the locking position, the modules roll onto the East and West Container Panel platforms. FIG. 5 depicts the rolling rack channels on the platform panels as well as where the back braces will lock into for support and angle position of the modules 27. The South Container Panel (SCP) 28 unlatches from its locking mechanism and is manually lifted up along its rolling channel to begin deployment.

FIG. 6 is phase IV of the deployment of the Open Energy System. As the SCP folds open 29, the bottom rollers on the SCP will slide up along the rolling rack channels inside the container frame while the top of the SCP rotates down 32. This exposes the PV modules on the inside of the SCP. The SCP rolls until it locks along the rolling rack channel. A brace in the frame is extended to connect to the now bottom of the SCP and used to support the bottom of the SCP. The brace connects the SCP to the frame container unit.

The Rolling Rack Modules (RRM) are solar PV modules where the frame of the PV module is modified with deployable features. These features have roller wheels on the PV module frame that glide along the rolling rack channels on the East and West Container Panel Platforms and stop and lock at the end of the channel on the platform panel 27. Inside the container frame, the RRMs are attached and locked for storage 35 until deployed. Each RRM has an upper and lower rack channel 35, 36 that secure the modules while in transit as well as guide the RRM when deployed. Behind each RRM is an extendable support brace/bracket arm that once pulled from the closed position behind the module extends and reaches then locks into the receiving bracket 27 on the panel platform, as seen in FIG. 5. Inside the frame container with the RRMs are additional Rack Panels (RP) 31 that can be separated from the upper and lower racks inside the container frame and deployed away, but near the unit. This mechanism allows for more storage of solar modules and thus more generated power. Each RP has braces behind it, as does the RRMs, but they also have a lower support brace that connects to the main brace to create an "L" shape support for the modules. The end of each conjoined brace has a hole so the RP can be staked into the ground for extra support against movement. Up to four additional rack panels can be stored inside the frame unit.

FIG. 7 is deployment phase V of the present invention. As previously stated in [0041] the East Container Panel and the West Container Panel also have Rolling Rack Modules with deployable features. Once the ECP and WCP are fully opened and in platform position, the RRMs lying on each panel 33 are simply unlocked/unhinged from the panel and are pulled along the sliding rack 34 attached to the ECP and WCP. The bottom of the RRM is attached and locked into the sliding rack on the panel so that when lifted up from the top of the RRM, it creates an optimal angle for solar insolation. The top of the RRM is lifted to expose the support brace/bracket underneath the module that connects to a notch in the sliding brace on top of the platform feet 19. Additional platform feet are screwed onto the ends of the RRMs for unit balance and support. With the ECP and WCP RRMs deployed, the rolling rack channels 27 on the ECP and WCP are exposed and ready for the internal RRPs 30 to deploy.

FIG. 8 is a perspective view of a fully deployed Open Energy System. The standing frame of the unit 37 is apparent; all systems of the unit are deployed. The solar cells are wired, connected to a junction box then to the battery charging system via connector inside the skid base 1 of the unit. The charging system is an inverter/charger system which controls the electrical operation of the unit. The inverter/charger takes the input energy from the array and directs it to charge the batteries. It then converts the battery DC energy into AC power (inverting) when a load is attached.

The OES unit can have a diesel generator attached to the unit. The purpose of the generator is to automatically start to charge the batteries in the event that that solar generation is unable to keep the batteries fully charged. The generator AC is converted to DC by the inverter/charger and directed to charge the batteries. In the event of inverter/charger failure where it cannot provide output AC, the generator can bypass that system and power the load directly. The generator will incorporate a fuel tank allowing it to run for approximately eight hours without refueling. The generator can also be easily fueled.

Thus it will be appreciated by those skilled in the art that the present invention is not restricted to the particular preferred embodiments described with reference to the drawings, and that variations, methods and modifications may be made therein without departing from the scope and spirit of the present invention as defined in the appended claims and equivalents thereof.

INDUSTRIAL APPLICABILITY

The problems and shortcomings addressed by the Open Energy System solar unit (OES) are many, as can be easily seen by those skilled in this art. The OES solar unit is the solution to portable, clean, easy to use, mobile power because its solution is the way the unit is packaged.

OES is small enough to fit five units to a standard ISO shipping container or can be as large as an ISO shipping container. Because it can ship inside shipping containers, it can be shipped alongside world commerce with countless other shipping containers making the OES available to any port in the world. The OES can also be flown in by aircraft and held by the detachable lifting eyes on the external body of the unit for aerial lifts and drops. The lifting eyes are strong enough to support the weight of the unit and as well as the movement of the unit while in flight. This portability option allows for OES units to be dropped in very remote locations. Furthermore, the OES power unit cannot be "lost." Within the OES is a GPS unit that can track the location of the power unit until it has reached its desired location.

Even when the OES has reached its location, it can be moved because it is a mobile unit. The OES unit can be hitched to any vehicle and pulled to another location. With the unit completely closed and locked, the axel-wheel attachments in the slide compartments in the base of the unit can be pulled out and assembled to fit through the forklift pockets so the unit is on tires. Because the base of the OES is configured for a forklift grip, a forklift can also be used to move the unit. This mobile ability allows the unit to be where it is needed without much complication and with various solutions.

The container of the OES means that it is its own packaging, which does away with excess trash. With the tough and durable exterior shell, the components of the system are housed inside the unit and are preassembled. This makes for easy operation of the unit. The OES simply needs to be opened, started and the unit can begin working right away. The OES plug and play concept can conceivably help save lives by not requiring operators to assemble electrical equipment.

The OES power unit can produce 3 kW-6 kW or more with a single unit. Units become modular by linking two or more OES units. In doing such, an even larger output can be achieved. Regardless of the electrical configuration of the power received, the internal components of the OES power unit are designed to transform and/or store the generated power in a manner allowing for access to the power in a plurality of different electrical configurations. The OES power unit may provide access in the form of alternating current of varying voltages and direct current of varying voltages.

The OES power unit also serves as a clean and environmentally benign solution to traditional power sources. The OES as well as different models of the OES power unit have zero emissions and leave no adverse impact to the environment to operate or transport. The environmentally friendly design and function of the power unit makes the OES a potential for government tax incentives and other programs that favor green energy initiatives. With tax credit incentives as well as savings on fuels, the OES also creates a great money savings to the buyer.

Further, because the OES power unit generates electricity using solar there is no need to refuel the unit, unlike other forms of power units. This could actually save the lives of those who would otherwise need to refuel units or those that transport fuel to units, particularly in hostile areas.

The benefits that the OES power unit container demonstrates is coupled with the use of tried and true technology—the best available solar modules, batteries, charge controllers and the like. This means the technology is tested and proven. The proven technology of batteries inside the OES power unit store power so that power is available when it is needed. The OES can provide power in emergencies, power at night from stored back up power and during cloudy days.

The OES power unit has a rugged and durable exterior shell where also thereby the weight and shape of the unit protect against unintended movement. Once at location, the OES power unit can be anchored down into the ground with stakes for additional support against wind.

Thus, it will be appreciated by those skilled in this art that the present invention is not restricted to the particular preferred embodiments described with reference to the drawings, and that variations may be made therein without departing from the scope and spirit of the present invention as defined in the appended claims and equivalents thereof.

What is claimed is:

1. An open energy system, comprising a portable and pre-assembled renewable electrical power generating unit having the ability to receive power from a plurality of power generating devices and providing access to the received power, the unit comprising: a support frame comprising rolling rack channels and defining a box having a top, bottom, and four sides, a hollowed platform base forming a bottom of the box, a mobile and transportable container comprising panels attached to the support frame, additional detachable solar rack modules stored on rolling rack channels on the hollowed platform base for assembly outside of the container, wherein
   a retractable Top Container Panel comprising a rolling rack solar module forms the top of the box, opposes the hollowed platform base, and is slidably attached by rollers to rolling rack channels on a top of the support frame,
   a retractable South Container Panel comprising a rolling rack solar module forms a side of the box, is slidably attached by rollers to rolling rack channels on a south side of the support frame, and opposes a stationary North Container Panel,
   a retractable East Container Panel comprising a rolling rack channel and a rolling rack solar module forms a side of the box and is hingedly attached to the support frame proximate the hollowed platform base on an east side of the support frame,
   a retractable West Container Panel comprising a rolling rack channel and a rolling rack solar module forms a side of the box opposing the side of the East Container panel and is hingedly attached to the support frame proximate the hollowed platform base on a west side of the support frame.

2. An Open Energy System according to claim 1 wherein the hollowed platform base houses batteries, an inverter, a charge controller, an air compressor, an air receiver tank, a winch and battery wiring; the contents in the platform base can be accessed by opening a floor door.

3. An Open Energy System according to claim 1 wherein the hollowed platform base has side slide-out pockets, wherein one side slide-out pocket houses winch wire, another side slide-out pocket houses a small jack, another side slide-out pocket houses platform feet, another side slide-out pocket houses small tires and axle, another side slide-out pocket houses a pulley;
  the hollowed platform base provides solid center weight for the unit; the platform base serves as the foundation of the unit.

4. An Open Energy System according to claim 1 wherein the hollowed platform base has forklift pockets in order to be lifted by forklift; platform base forklift pockets double as sockets for wheel brackets when wheels and axle are placed on the unit.

5. An Open Energy System according to claim 1 wherein a temperature of said batteries is controlled by temperature controlling insulation and air vents further including cooling fans mounted in said container; said batteries are housed tightly inside the fitted platform base to which the batteries are unable to move.

6. An Open Energy System according to claim 1, further comprising an inverter to convert energy from direct current to alternating current; further including an electric output connector to connect the portable and preassembled renewable electrical power system to a structure or vehicle to supply electric energy to the structure or vehicle.

7. An Open Energy System according to claim 1 wherein a mobile and transportable container means a unit that can be shipped using its own robust container;
  a unit that is fit to ship five units inside a ISO shipping container;
  a unit that can be lifted by aircraft by the demountable lifting eyes on the unit;
  a unit that can lock its own wheels onto the skid-base of the unit and be attached by hitch to the back of a vehicle for mobility;
  a unit that can be moved by forklift and;
  a unit that is preassembled and ready to deploy.

8. An Open Energy System according to claim 1 comprising a side access door located on the stationary North Container Panel.

9. An Open Energy System according to claim 8 wherein the East Container Panel and West Container Panel unlatch from hinged rotation to horizontal platform position.

10. An Open Energy System according to claim 8 wherein the rolling rack channels include a locking mechanism and locking mechanism cap to hold the rollers on in place, lock the rolling rack solar modules and prevent rolling rack solar modules from sliding out of position.

11. An Open Energy System according to claim 8 wherein platform feet are taken out of a slide-out pocket in the hollowed platform base and screwed on to the East Container Panel and West Container Panel in designated inserts to create a level and perfectly horizontal platform for the unfolding container panels and slide out modules.

12. An Open Energy System according to claim 8 wherein the South Container Panel unlatches and is lifted upward on rolling rack channels that are located inside the support frame; when, as the South Container Panel is being pulled open the bottom of the panel is attached to rolling rack channels; while the bottom of the South Container Panel moves upward the container frame and the top of the South Container Panel folds down and outward, until eventually the top of the South Container Panel becomes even with the base;
  the South Contained Panel locks into the frame and the top of the South Container Panel attaches to an extended support brace/bracket on the support frame to create a tilt/angle and support for the South Container Panel;
  the South Container Panel has solar modules mounted atop the South Container Panel which are exposed when it is opened.

13. An Open Energy System according to claim 8 wherein said side access door is located on the North Container Panel for internal access to contents during shipping or storage;
  the access door is located on the North Container Panel which is a fixed panel and does not open or fold out; the fixed North Container Panel also acts as a weight and structural support for the portable and preassembled renewable electrical power generating unit.

14. An Open Energy System according to claim 8 wherein the Top Container Panel unlatches and is rolled south on the roller channels located on the support frame for deployment;
  a hoisting pulley/winch is removed from a side slide-out pocket in the base and is inserted into position atop the North Container Panel;
  the winch pulls the Top Container Panel up while the bottom corners of the panel slides along the rolling rack channels until it stops and locks at an optimal tilt angle;
  one support brace/bracket on each side of a Top Container Panel Frame lifts up to meet the Top Container Panel, locks onto the Top Container Panel and provides support for the Top Container Panel at an optimal solar angle.

15. An Open Energy System according to claim 1 with the Top, East, West, and South Container Panels open and the North Container Panel stationary, the support frame of the container/unit remains and is the location for upper rack channels and lower rack channels that house the rolling rack solar modules for deployment as well as the additional detachable solar rack modules; the East and West Container Panels comprising rolling rack channels with separate rolling rack solar modules for deployment.

16. An Open Energy System according to claim 15 wherein the rolling rack solar modules and additional detachable rack modules are solar modules whose frame has been modified with rollers as to work in conjunction with the rolling rack channels for deployment purposes.

17. An Open Energy System according to claim 15 when in open platform position, the West and East Container Panels can retract rolling rack solar modules that are located on the inside of the West and East Container Panels and are exposed once the West and East Container Panels are in platform position;
  the solar rolling rack modules slide horizontally along a fixed rolling rack channel/sliding brace on the top of the West Container Panel and East Container Panel;
  the rolling brace locks the solar rolling rack modules at the bottom of the module when the modules are fully pulled out; when the solar rolling rack modules are lifted up at the top of the module, two support braces folded behind the solar rolling rack modules are pulled out to create support, lock into support frame/container panel notches and are positioned at an optimal solar insolation angle;
  additional platform feet are screwed onto the ends of the rolling rack modules for unit balance and support.

18. An Open Energy System according to claim 15 wherein the support frame has built-in upper and lower rolling rack channels that store rolling rack solar modules as well as the additional detachable solar rack modules;
  the rolling rack solar modules are unlocked and roll/slide out of the center of the container and onto the East and West Container Panels along the exposed rolling rack channels;

the rolling rack channel extends onto the East and West Container Panels guiding the rolling rack solar modules along the track and stop the solar rack modules in position and lock into place;

the rolling rack solar modules each have support braces on the back side of the module and when the support brace is pulled out, the brace extends towards an East or West Container Panel and locks into a notch to create an optimal solar angle.

19. An Open Energy System according to claim 15 wherein the upper rack channels and lower rack channels store the rolling rack solar modules as well as additional detachable solar rack modules that can be taken off the rolling track channel and assembled outside, but next to the portable and preassembled renewable electrical power generating unit;

each additional detachable solar rack module has individual support brackets/braces behind the module that, when pulled out, the braces support the solar modules and create an angle for optimal solar generation;

the additional detachable solar rack modules are for additional power generation;

the additional detachable solar rack modules remain a part of the central unit and function with the unit;

the additional detachable solar rack modules can be staked in the ground for support and to prevent unintended movement.

20. An Open Energy System according to claim 15 that is fully open and is a portable and preassembled renewable electrical power generating unit that transforms from a mobile container to open energy system.

* * * * *